United States Patent
Ferreol et al.

(10) Patent No.: US 7,952,521 B2
(45) Date of Patent: May 31, 2011

(54) MULTIPARAMETRIC DIRECTION FINDING METHOD COMPRISING THE SEPARATION OF THE INCIDENCE AND NUISANCE PARAMETERS

(75) Inventors: Anne Ferreol, Colombes (FR); Pascal Larzabal, L'Hay les Roses (FR)

(73) Assignee: Thales (FR)

( * ) Notice: Subject to any disclaimer, the term of this patent is extended or adjusted under 35 U.S.C. 154(b) by 698 days.

(21) Appl. No.: 11/571,265

(22) PCT Filed: Jun. 21, 2005

(86) PCT No.: PCT/EP2005/052888
§ 371 (c)(1),
(2), (4) Date: Jan. 31, 2008

(87) PCT Pub. No.: WO2006/000554
PCT Pub. Date: Jan. 5, 2006

(65) Prior Publication Data
US 2008/0252526 A1    Oct. 16, 2008

(30) Foreign Application Priority Data
Jun. 25, 2004  (FR) ..................... 04 07007

(51) Int. Cl.
G01S 5/04 (2006.01)
G01S 3/80 (2006.01)
(52) U.S. Cl. .......................... 342/441; 342/420; 367/118
(58) Field of Classification Search ............... 342/377, 342/420, 441, 444; 367/118
See application file for complete search history.

(56) References Cited

U.S. PATENT DOCUMENTS
2003/0052820 A1    3/2003 Ferreol

OTHER PUBLICATIONS

A. Ferreol et al., Low-cost algorithm for some bearing estimation methods in presence of separable nuisance parameters, Electronics Letters, vol. 40(15), p. 966-967, Jul. 2004.*
A. Ferreol et al., Asymptotic performance for subspace bearing methods with separable nuisance parameters in presence of modeling errors, Proceedings of the IEEE International Conference on Acoustics, Speech, and Signal Processing, vol. 4, p. 953-956, Mar. 2005.*

(Continued)

*Primary Examiner* — Thomas H Tarcza
*Assistant Examiner* — Fred H Mull
(74) *Attorney, Agent, or Firm* — Lowe Hauptman Ham & Berner, LLP (57) ABSTRACT

Method of multi-parameter direction finding of several sources in an array of N sensors, comprising at least the following steps: a) choosing a parameter to be determined, or parameter of interest, b) expressing the direction vector in the form of a linear relation between the parameter of interest chosen and the secondary parameters $b_0(\theta, \Phi_0) = U_0(\theta) \phi_0(\Phi_0)$, c) applying a MUSIC-type direction finding step by factorizing the criterion serving for the determination of the angles of incidence so as to determine at least the incidence parameter, d) on the basis of the incidence value, determining the vector representative of the secondary parameters and expressing this vector in the form of a linear relation between a chosen parameter to be determined and the other secondary parameters, e) applying a MUSIC-type direction finding step by factorizing the criterion serving in the determination of the chosen parameter, f) repeating steps d) to e) so as to determine the majority or the whole set of secondary parameters.

13 Claims, 6 Drawing Sheets

OTHER PUBLICATIONS

Ferreol A et al: "Space Frequency direction finding in wide-band and multi-path contexts", IEEE vol. 5, Jun. 5, 2000, pp. 3113-3116, XP01050667.

Taga F: "Smart Music algorithm for DOA estimation" Electronics Letters, IEE Stevenage, GB, vol. 33, No. 3, Jan. 30, 1997, pp. 190-191, XP006007029.

Wang G et al: "Iterative algorithm for direction of arrival estimation with wideband chirp signals" IEE Proceedings: Radar, Sonar & Navigation, Institution of Electrical Engineers, GB, vol. 147, No. 5, Oct. 3, 2000, pp. 233-238, XP006014428, ISSN: 1350-2395.

Mars J et al: "Extensions de la SVD aux donnees multidimensionnelles: Application a la separation de sources", Colloque sur le Traitment du Signal et des Images Gretsi, XX, XX, Sep. 8, 2003, XP002277103.

* cited by examiner

FIG.8

MULTIPARAMETRIC DIRECTION FINDING METHOD COMPRISING THE SEPARATION OF THE INCIDENCE AND NUISANCE PARAMETERS

CROSS REFERENCE TO RELATED APPLICATIONS

The present Application is based on International Application No. PCT/EP2005/052888, filed on Jun. 21, 2005 which in turn corresponds to France Application No. 04 07007 filed on Jun. 25, 2004 and priority is hereby claimed under 35 USC §119 based on these applications. Each of these applications are hereby incorporated by reference in their entirety into the present application.

The invention relates to a method of multiparameter direction finding by separating the incidence and the other parameters such as the bandwidth, the coupling coefficients, the width of the diffusion cone or else the source-sensor distance.

BACKGROUND

It applies in the field of antenna processing, where the signals originating from one or more emitters (sources) are received on a system of several sensors. The sources are received at different angles of incidence.

In an electromagnetic context, the sensors are antennas and the sources emit a polarized radioelectric signal. In an acoustic context the sensors are microphones and the sources are sound sources.

The sensors of the array receive the sources with a phase and an amplitude dependent on their angle of incidence as well as on the position of the antennas in terms of narrowband, plane wavefront and with no perturbations on the reception channels and the sensors of the array.

The antenna processing techniques currently known have the principal objective of utilizing spatial diversity. More particularly, the direction finding or locating of sources has the objective of estimating the angles of incidence of the emitters on the basis of an array of sensors.

In a nominal fashion, the direction finding procedures like MUSIC [1] assume that the wavefront is plane, that the sources are narrowband, point sources, with no polarization diversity, no coherent path and no disturbance of the response of the sensor array to a source. When one of these suppositions does not hold, the response of the array of sensors to a source no longer depends solely on the incidence but on other parameters such as the bandwidth, the coupling coefficients, the width of the diffusion cone or else the source-sensor distance.

The prior art describes various techniques making it possible to compensate for some of these disturbances. The estimation of the secondary parameters (parameters other than the incidence) is not envisaged in most techniques with the exception of reference [2] for polarization diversity. Techniques thus exist which adapt direction finding algorithms to diffuse sources [3][4][5]. For the wideband context, there exist focusing techniques [6][7] or spatio-frequency techniques [8][9][10][11]. For the techniques for compensating for the distortions of the response of the array the literature is very rich [12][13] etc.

In the prior art the techniques for compensating for the distortions of the response of the array of sensors process each of the disturbances in an isolated fashion without however taking account of several disturbances at one and the same time. Such techniques therefore turn out to be inadequate, in particular, in numerous acoustic applications where the wave is at one and the same time wideband and received as a curved wavefront. For radioelectric sources, it is possible to have an antenna array disturbed by coupling with polarization diversity waves and coherent paths.

SUMMARY

The subject of the present invention rests notably upon a different approach. The idea consists in particular in estimating separately the incidence parameter and the other parameters termed secondary parameters.

The objective of this patent is therefore to implement a method for carrying out direction finding of sources in the presence of physical disturbances rendering conventional techniques nonoperational:
- azimuth or azimuth-elevation direction finding with a criterion dependent only on the direction of arrival
- allowance for one or more physical disturbances
- estimation of the secondary parameters related to the disturbance.

The invention relates to a method of multiparameter direction finding of several sources in an array of N sensors, a sensor receiving a linear mixture of M sources with direction of arrival or DOA ($\theta_m$ with $1 \leq m \leq M$), the observation vector corresponding to the signals received on the sensors being expressed as a linear combination of the responses to the array of sensors of each of the emitters (which is a linear combination of vectors dependent on the incidence $\theta_m$ and the nuisance vector $\Phi_m$ for the $m^{th}$ emitter) with the complex envelope of the signal of the $m^{th}$ emitter, characterized in that it comprises at least the following steps:
a) choosing a parameter to be determined, or parameter of interest,
b) expressing the direction vector (or response of the array of sensors to a source of incidence $\theta$ and of nuisance vector $\Phi_0$) in the form of a linear relation between the parameter of interest chosen and the secondary parameters $b_0(\theta, \Phi_0) = U_0(\theta) \phi_0(\Phi_0)$,
c) applying a MUSIC-type direction finding step by factorizing the criterion serving for the determination of the angles of incidence so as to determine at least the incidence parameter,
d) on the basis of the incidence value, determining the vector representative of the secondary parameters and expressing this vector in the form of a linear relation between a chosen parameter to be determined and the other secondary parameters,
e) applying a MUSIC-type direction finding step by factorizing the criterion serving in the determination of the chosen parameter,
f) repeating steps d) to e) so as to determine the majority or the whole set of secondary parameters.

The direction finding procedure of the method according to the invention estimates the incidences jointly with the secondary parameters for a low numerical cost.

BRIEF DESCRIPTION OF THE DRAWINGS

Other characteristics and advantages of the present invention will become better apparent on reading the description which follows of an exemplary embodiment given by way of wholly non limiting illustration appended with the figures which represent:

FIG. 1 an exemplary antenna processing system,
FIG. 2 a representation of the incidences of a source,
FIG. 3 the schematization of a nonplane wavefront, FIG. 4 the illustration of a source emitting in a diffusion cone, FIG. 5 the diagram of a coupling between the sensors of an array, FIG. 6 the illustration of the coupling of the sensors with a structure, FIG. 7 the diagram of the propagation of a source as multipaths, FIG. 8 the illustration of the wave vector and of the wavefront.

DETAILED DESCRIPTION

In order to better understand the principle implemented in the method, the example which follows is given for performing direction finding of radioelectric signals in an array of sensors.

Figure 1:
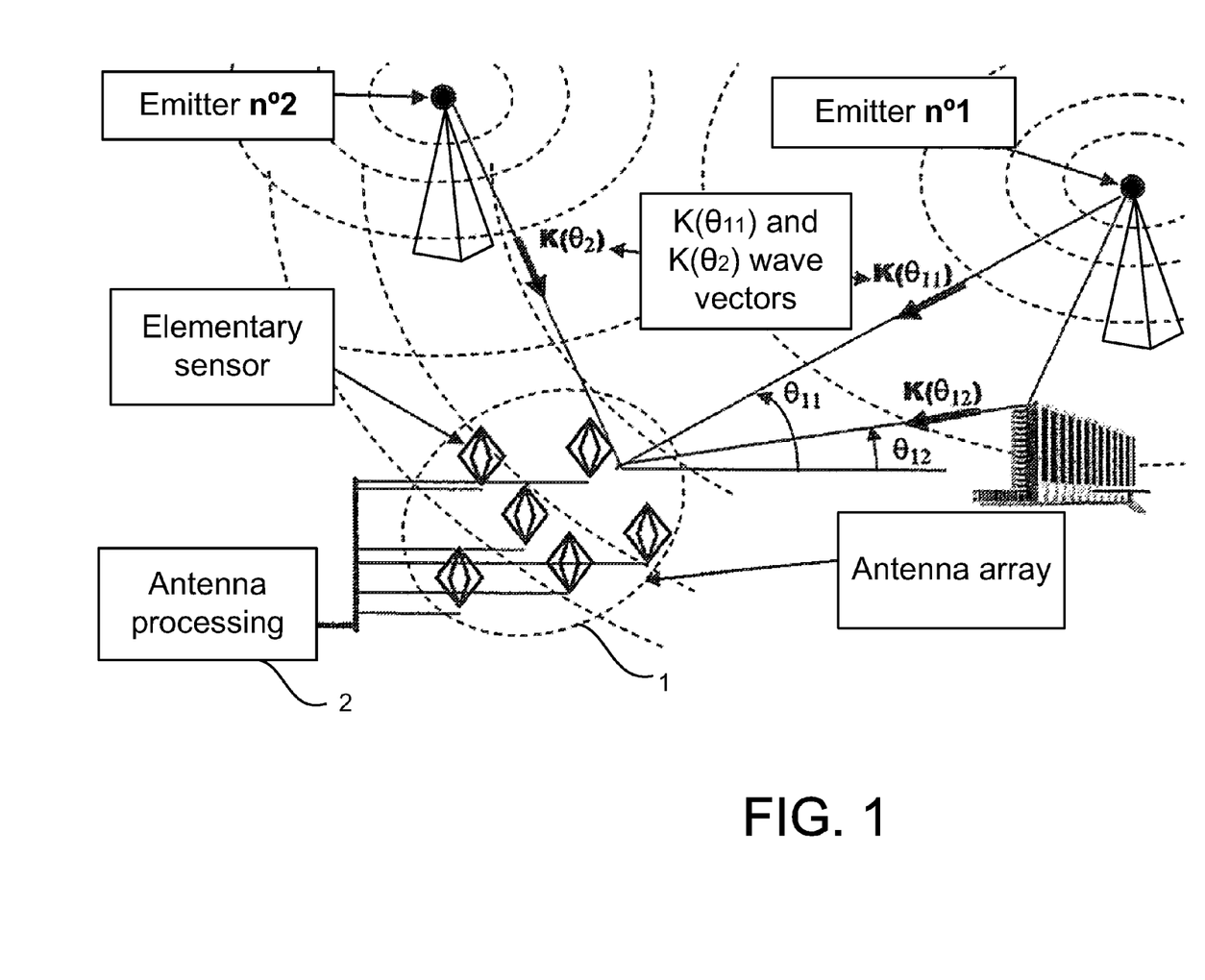
Figure 2:
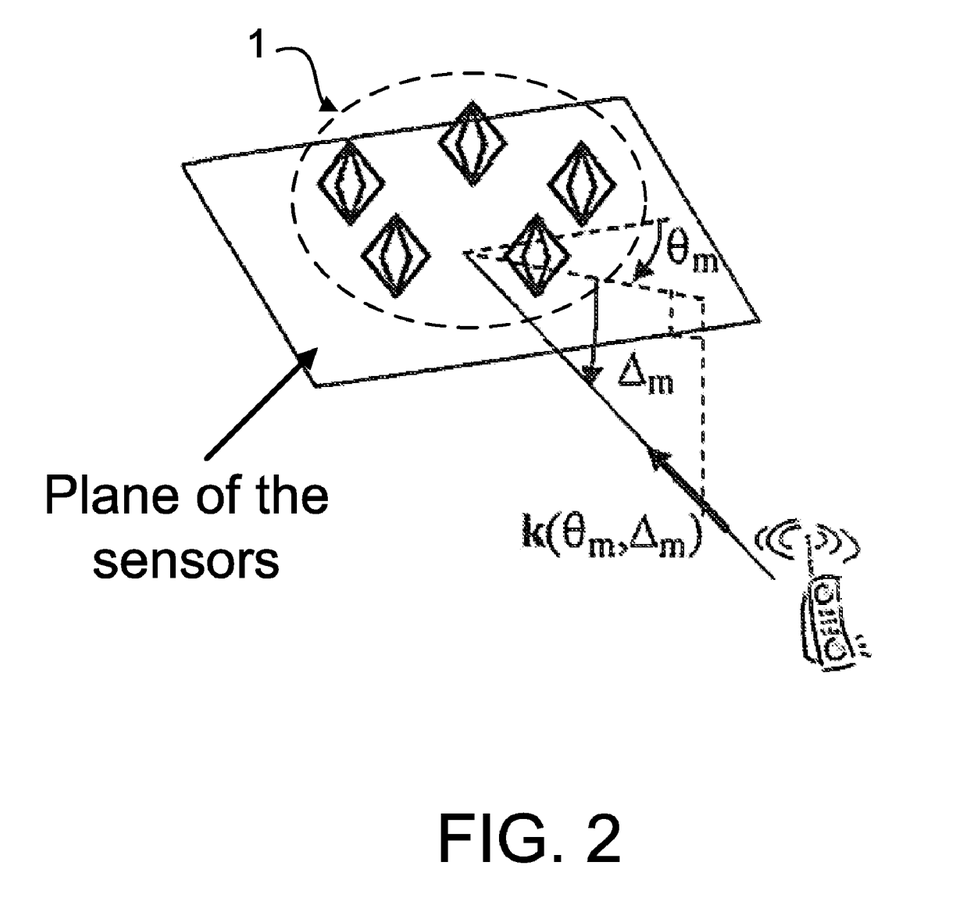

FIG. 1 diagrammatically schematizes an antenna processing system composed for example of an array 1 with several sensors Ci receiving sources at different angles. The antenna array comprises for example N elementary sensors in conjunction with an antenna processing device 2. The figure represents 2 emitters. The angles of incidence may be parameterized either in 1D by azimuth $\theta_m$ ($\Delta_m=0$) or in 2D by azimuth $\theta_m$ and elevation $\Delta_m$. FIG. 2 defines the azimuth and elevation parameters.

The description uses the word source or emitter interchangeably to designate one and the same element.

Before explaining the steps implemented in the method according to the invention, a few reminders are given regarding the signals.

Model and Formulation of the Problem x(t) is the vector of dimension N×1 composed of the complex envelopes of the signals received $x_n(t)$ ($1 \leq n \leq N$) at the output of the N sensors. Each sensor receives a mixture of the M sources of incidence $\theta_m$ ($1 \leq m \leq M$). Under these assumptions, the vector x(t) may be written:

$$x(t) = \sum_{m=1}^{M} b(\theta_m, \Phi_m) s_m(t) + n(t) \qquad (1)$$

where b($\theta$, $\Phi$) is the response of the array of sensors to a source of incidence $\theta$ and of nuisance vector $\Phi$, $s_m(t)$ is the complex envelope of the signal of the $m^{th}$ emitter of incidence $\theta_m$ and of nuisance parameter $\Phi_m$ and finally n(t) is the noise vector. The vector $\Phi$ is composed of the nuisance parameters such as the frequency band of the signals, the coupling coefficients of the array, the cone width of the diffuse sources, the polarization, etc. The expression (1) may be rewritten in the following manner:

$$x(t)=Bs(t)+n(t) \qquad (2)$$

where:

$$B=[b(\theta_1,\Phi_1) \ldots b(\theta_M,\Phi_M)] \text{ and } s(t)=[s_1(t) \ldots s_M(t)]^T \qquad (3)$$

where $( \ldots )^T$ is the operation of transposing a vector. A conventional subspace procedure [1] relying on the model of equation (1) requires a costly joint estimation of the angle $\theta_m$ and of the nuisance vector $\phi_m$ of each of the sources. One of the objectives of the method is in particular to reduce the complexity on the basis of a particular modeling of the direction vector b($\theta$, $\phi$) (response of the sensor array to a source of incidence $\theta$ and of the nuisance vector.)

Method of Multiparameter Location

Factorization of the Direction Vector

The method according to the invention comprises for example a first step, with the direction vector representative of the response of the array of sensors to a source of incidence $\theta$ and nuisance parameters, expressed as a linear relation between a parameter of interest (parameter that one seeks to determine initially) and the so-called secondary parameters. For example, the direction vector b($\theta$, $\Phi$) is factorized as follows:

$$b(\theta,\Phi)=U(\theta)\gamma(\Phi) \qquad (4)$$

where $\gamma(\Phi)$ is a vector dependent on $\Phi$.

More generally the idea is to express the direction vector representative of the response of the sensor array to a source of incidence $\theta$ and nuisance parameters, as a linear relation between a parameter of interest (parameter that one seeks to determine initially) and the so-called secondary parameters. In the example given, the parameter of interest is the incidence $\theta$ and the other secondary parameters are grouped together into the vector $\Phi$.

The direction vector having been factorized, the next step consists in carrying out a direction finding. In the case where the direction vector b($\theta$, $\Phi$) is already in the form of a linear combination of the incidence parameter U($\theta$) and of a vector $\gamma(\Phi)$ which is a vector dependent on the nuisance parameters, the direction finding step explained herein below is applied directly.

Direction Finding on the Sensor Observations x(t)

In the general case known to the person skilled in the art, the MUSIC procedure [1] estimates the M minima ($\theta_m$, $\Phi_m$) of the following normalized criterion:

$$J(\theta, \Phi) = \frac{b(\theta, \Phi)^H \prod_b b(\theta, \Phi)}{b(\theta, \Phi)^H b(\theta, \Phi)} \text{ with } 0 \leq J(\theta, \Phi) \leq 1 \qquad (5)$$

where $( \ldots )^H$ is the transposition and conjugation operator and $\Pi_b = E_b E_b^H$ is the projector orthogonal to the vector basis b($\theta_m$, $\Phi_m$) ($1 \leq m \leq M$) and is spanned by the columns of the matrix $E_b=[e_{M+1} \ldots e_N]$ where ($\lambda_i$, $e_i$) is the $i^{th}$ eigenvalue and eigenvector to order 2 of the covariance matrix $R_{xx}=E[x(t) x(t)^H]$ with $\lambda_1 \geq \ldots \lambda_K \geq \ldots \geq \lambda_N$. In the subsequent description, the matrix $E_b$ may arise from the noise space of the matrix $R_{yy}=E[f(x(t)) f(x(t))^H]$ to order 2 or else from the quadricovariance of x(t) (or f(x(t)) to order 4. By inserting the model of b($\theta$, $\Phi$) of equation (4) into (5) the MUSIC criterion becomes:

$$J(\theta, \Phi) = \frac{\gamma(\Phi)^H Q_1(\theta) \gamma(\Phi)}{\gamma(\Phi)^H Q_2(\theta) \gamma(\Phi)} \text{ where:} \qquad (6)$$

$$Q_1(\theta) = U(\theta)^H \prod_b U(\theta) \text{ and } Q_2(\theta) = U(\theta)^H U(\theta) \qquad (7)$$

By using the theory of quadratic forms [14], the criterion of equation (6) may be reduced in the following manner as a function of the incidence $\theta$:

$$J_{min}(\theta)=\lambda_{min}^G\{Q_1(\theta),Q_2(\theta)\} \qquad (8)$$

where $\lambda_i^G \{A, B\}$ is the $i^{th}$ generalized eigenvalue of the square matrices A and B where $\lambda_{min}^G \{A, B\}$ is the minimum eigenvalue. According to the definition of $\lambda_i^G (A, B)$ we also get:

$$J_{min}(\theta)=\lambda_{min}\{Q_2(\theta)^{-1} Q_1(\theta)\} \qquad (9)$$

where $\lambda_i \{A\}$ is the $i^{th}$ eigenvalue of the square matrix A where $\lambda_{min} \{A\}$ is the minimum eigenvalue.

Knowing that $J(\theta_m, \Phi_m)=0$, the criterion (9) also satisfies $J_{min}(\theta_m)=0$ and may be replaced by:

$$J_{det}(\theta) = det(Q_2(\theta)^{-1} Q_1(\theta)) = \frac{det(Q_1(\theta))}{det(Q_2(\theta))} \quad (10)$$

Finally the M incidences $\theta_m$ cause the criterion $J_{det}(\theta)$ to vanish. According to (8) and (9) the estimate $\hat{\gamma}_m$ of the vector $\gamma(\Phi_m)$ associated with the incidence $\theta_m$ is the generalized eigenvector associated with the eigenvalue $\lambda_{min}^G \{Q_1(\theta_m), Q_2(\theta_m)\}$.

When for certain applications $\gamma(\Phi_m)$ satisfies $\gamma(\Phi_m)=(\Phi_m)$ or $\gamma(\Phi_m)=[1\Phi_m]^T$, the vectors of parameters $\Phi_m$ are deduced directly from the estimates $\hat{\gamma}_m$ of the $\gamma(\Phi_m)$.

For the other applications the obtaining of the parameters of the vector $\Phi_m$ is obtained by searching for the vector which causes the following criterion to vanish:

$$C_m(\Phi) = \frac{\gamma(\Phi)^H \prod_m \gamma(\Phi)}{\gamma(\Phi)^H \gamma(\Phi)} \text{ with } \prod_m = I - \hat{\gamma}_m \hat{\gamma}_m^\# \quad (11)$$

where $(.)^\#$ designates the pseudo-inverse and I the identity matrix. Equation (11) shows that the determination of $\Phi_m$ requires the optimization of a multidimensional criterion in the components of $\Phi$. To reduce the calculational cost the method suggests isolating one of the parameters of $\Phi$ so as to subsequently model $\gamma(\Phi)$ as follows:

$$\gamma(\Phi)=G_1(\phi)\gamma_1(\Phi') \text{ where } \Phi=[\phi \Phi'^T]^T \quad (12)$$

Examples of the model of equation (12) will be given in the subsequent description. Knowing that $C_m(\Phi_m)=0$ and using the results of equations (6) to (10), the criterion of equation (11) reduces in the following manner in $\phi$ (component of the vector $\Phi$):

$$C_{m-det}(\varphi) = \frac{det(Q_{m1}(\varphi))}{det(Q_{m2}(\varphi))} \quad (13)$$

with:

$$Q_{m1}(\varphi) = G_1(\varphi)^H \prod_m G_1(\varphi) \text{ and } Q_{m2}(\varphi) = G_1(\varphi)^H G_1(\varphi) \quad (14)$$

The first component $\phi_m$ of the parameter vector $\Phi_m$ is estimated by searching for the minimum of the criterion $C_{m-det}(\phi)$. As previously the vector $\gamma_1(\Phi_m')$ associated with the parameter $\phi_m$ is the generalized eigenvector associated with the eigenvalue $\lambda_{min}^G \{Q_{m1}(\Phi_m), Q_{m2}(\phi_m)\}$.

To estimate the remaining parameters of the vectors $\Phi_m$ contained in the vectors $\Phi_m=[\phi_m \Phi_m'^T]^T$, the operations of equations (11) to (14) may be repeated successively so as each time to carry out a single-parameter criterion optimization.

Direction Finding on a Transformation of the Vector x(t)

The direction finding procedures using the covariance matrix of the observations $R_{xx}=E[x(t) x(t)^H]$ make it possible to carry out direction finding up to N-1 sources when the observation vector x(t) is a dimension N×1. In order to be able to estimate the incidences of more sources, it is necessary to construct an observation vector y(t)=f(x(t)) of larger dimension than x(t). In particular, the method comprises a step of spatio-temporal transformation:

$$y(t) = f(x(t)) = \begin{bmatrix} x(t) \\ \vdots \\ x(t-L+1) \end{bmatrix} \quad (15)$$

This amounts to increasing in a virtual manner the number of sensors and the number of sources while complying with the fact that the ratio of the number of sensors to the number of sources must be less than the ratio of the number of real sensors to the number of real sources.

The term L is the factor of increase of the number of virtual sensors in spatio-temporal terms. The virtual sensors associated with observation x(t-τ) are the real sensors placed behind the delay lines of delay τ.

It should be noted that in the presence of M signal carriers $s_m(t)=\exp(j2\pi f_m t)$ the rank of the covariance matrix $R_{yy}=E[y(t) y(t)^H]$ equals M. Consequently, the observation vector y(t) makes it possible to perform direction finding up to NL-1 carriers. When the sources have a wider band than a carrier, the rank of $R_{yy}$ is no longer greater than M and the direction finding can locate fewer than NL-1 sources. Without any particular assumption regarding the bandwidth of the incident signals the procedure described above may be applied to the covariance matrix $R_{yy}$ by replacing the matrix $U(\theta)$ of equation (4) by the following matrix $U_L(\theta)$:

$$U_L(\theta) = \begin{bmatrix} U(\theta) & \cdots & 0 \\ \vdots & \ddots & \vdots \\ 0 & \cdots & U(\theta) \end{bmatrix} \quad (16)$$

The matrix $U_L(\theta)$ is of dimension NL×PL when the matrix $U(\theta)$ is of dimension N×P. The signal space of $R_{yy}$ is spanned by the vectors $e_{mk}=U_L(\theta_m) \gamma_L(\Phi_m, \alpha_{mk})$ where:

$$\gamma_L(\Phi, \alpha) = \alpha \gamma(\Phi) \quad (17)$$

where α is a vector of dimension L×1 and $\otimes$ designates the Kronecker product. In order to utilize the noncircularity of the signals, the following observation vector may be constructed:

$$y(t) = f(x(t)) = \begin{bmatrix} x(t) \\ x(t) * \exp(j2\pi\beta t) \end{bmatrix} \quad (18)$$

In the presence of M BPSK of central frequency -β/2 (known by the person skilled in art in the field of telecommunications) the rank of the covariance matrix $R_{yy}$ equals M and thus the vector y(t) makes it possible to direction find up to 2N-1 BPSK. Without any particular assumption regarding the circularity of the incident signals the procedure described in the paragraph of the direction finding on the sensor observations x(t) may be applied to the covariance matrix $R_{yy}$ by replacing the matrix $U(\theta)$ of equation (4) by the following matrix $U_C(\theta)$:

$$U_C(\theta) = \begin{bmatrix} U(\theta) & 0 \\ 0 & U(\theta)* \end{bmatrix} \quad (19)$$

The signal space of $R_{yy}$ is spanned by vectors $e_{mk}=U_C(\theta_m)\gamma_C(\Phi_m,\alpha_{mk})$ where:

$$\gamma_C(\Phi,\alpha) = \alpha \otimes \begin{bmatrix} \gamma(\Phi) \\ \gamma(\Phi)* \end{bmatrix} \quad (20)$$

where $\alpha$ is a vector of dimension 2×1. To jointly utilize the bandwidth of the signals with their noncircularity, it is necessary to construct the following observation vector:

$$y(t) = f(x(t)) = \begin{bmatrix} y_L(t) \\ y_L(t)*\exp(j2\pi\beta t) \end{bmatrix} \text{ with } y_L(t) = \begin{bmatrix} x(t) \\ \vdots \\ x(t-L+1) \end{bmatrix} \quad (21)$$

Without any particular assumption regarding the circularity and the bandwidth of the incident signals the procedure described in the paragraph on the direction finding on the sensor observations x(t) may be applied to the covariance matrix $R_{yy}$ by replacing the matrix $U(\theta)$ of equation (4) by the following matrix $U_{LC}(\theta)$:

$$U_{LC}(\theta) = \begin{bmatrix} U_L(\theta) & 0 \\ 0 & U_L(\theta)* \end{bmatrix} \quad (22)$$

The signal space of $R_{yy}$ is spanned by vectors $e_{mk}=U_{LC}(\theta_m)\gamma_{LC}(\Phi_m,\alpha_{mk})$ where:

$$\gamma_{LC}(\Phi,\alpha) = \begin{bmatrix} \alpha_1 \otimes \gamma(\Phi) \\ \alpha_2 \otimes \gamma(\Phi)* \end{bmatrix} \text{ with } \alpha = \begin{bmatrix} \alpha_1 \\ \alpha_2 \end{bmatrix} \quad (23)$$

where $\alpha$ is a vector of dimension 2L×1.

In the presence of cyclo-stationary signals, the following observation vector may be constructed:

$$y(t) = f(x(t)) = \begin{bmatrix} x(t) \\ x(t-1)\exp(j2\pi\alpha t) \\ \vdots \\ x(t-L+1)\exp(j2\pi\alpha(L-1)t) \end{bmatrix} \quad (24)$$

With no particular assumption regarding the cyclo-stationarity of the incident signals the procedure described in the paragraph on direction finding on the sensor observations x(t) may be applied to the covariance matrix $R_{yy}$ by replacing the matrix $U(\theta)$ of equation (4) by the matrix $U_L(\theta)$ of equation (16).

To jointly utilize the cyclo-stationarity and the noncircularity of the signals, the following observation vector may be constructed:

$$y(t) = f(x(t)) = \begin{bmatrix} y_L^a(t) \\ y_L^a(t)*\exp(j2\pi\beta t) \end{bmatrix} \quad (25)$$

with $y_L^a(t) = \begin{bmatrix} x(t) \\ x(t-1)\exp(j2\pi\alpha t) \\ \vdots \\ x(t-L+1)\exp(j2\pi\alpha(L-1)t) \end{bmatrix}$ Without any particular assumption regarding the circularity and the cyclo-stationarity of the incident signals the procedure described in the paragraph on direction finding on the sensor observations x(t) may be applied to the covariance matrix $R_{yy}$ by replacing the matrix $U(\theta)$ of equation (4) by the matrix $U_{LC}(\theta)$ of equation (22).

The procedures above transform the vector x(t) into a vector y(t) which is elongated so as to apply a direction finding procedure using the order 2 statistics of y(t) with $R_{yy}=E[y(t)y(t)^H]$. From this matrix is extracted the noise projector $\Pi_b$ of equation (5).

To increase the capacity of the array of sensors in terms of number of sources, the statistics of higher order may be applied to the vector y(t) of dimension N'×1. The case where y(t)=x(t) is also envisaged for the subsequent description. In particular to order 4, the direction finding procedure may be applied to the following quadricovariance matrix:

$$Q_{yy}(I,J)=\text{cum}(y_i(t),y_j(t)*,y_k(t)*,y_l(t)) \quad (26)$$

where $y_i(t)$ is the $i^{th}$ component of y(t) and $$I=N(i-1)+j \text{ and } J=N(k-1)+l \quad (27)$$

where cum(x,y,z,w) denotes the cross-cumulant of the random variables x, y, z and w. In the present of M signals the observation vector y(t) may be written as the signal x(t) of equation (1) with direction vectors $b_y(\theta_m,\Phi_{mi})=U_y(\theta_m)y_y(\Phi_{mi})$ of larger or equal dimension (y(t)=x(t)) than $b(\theta_m,\Phi_m)$. Under these conditions y(t) may be written:

$$y(t) = \sum_{m=1}^{M}\sum_{i=1}^{I} b_y(\theta_m,\Phi_{mi})s_{mi}(t) + n(t) \quad (28)$$

In the presence of statistically independent signals the matrix of equation (26) may be written:

$$Q_{yy} = \sum_{m=1}^{M}\sum_{i=1}^{I} b_y(\theta_m,\Phi_{mi})^{\otimes 2} b_y(\theta_m,\Phi_{mi})^{\otimes 2H} \delta_{mi} \text{ where } u^{\otimes 2} = u \otimes u \quad (29)$$

with $\delta_{mi}=\text{cum}(s_{mi}(t),s_{mi}(t)*,s_{mi}(t)*,s_{mi}(t))$. Given that the covariance matrix $R_{xx}=E[x(t)x(t)^H]$ used in (0.0) may be written:

$$R_{xx} = \sum_{m=1}^{M} b(\theta_m,\Phi_m)b(\theta_m,\Phi_m)^H p_m + \sigma^2 I \quad (30)$$

with $p_m=E[|s_m(t)|^2]$, the application of the direction finding to $Q_{yy}$ is done with the direction vector $b_y(\theta_m,\Phi_{mi})^{\otimes 2}$ instead of $b(\theta,\Phi)$ for $R_{xx}$. The MUSIC procedure to order 4 estimates the M×I minima $(\theta_m, \Phi_{mi})$ of the following normalized criterion:

$$J(\theta, \Phi) = \frac{b_y(\theta, \Phi)^{\otimes 2H} \prod_{b4} b_y(\theta, \Phi)^{\otimes 2}}{b_y(\theta, \Phi)^{\otimes 2H} b_y(\theta, \Phi)^{\otimes 2}} \text{ with } 0 \leq J(\theta, \Phi) \leq 1 \quad (31)$$

where $\Pi_{b4} = E_b E_b^H$ is the projector orthogonal to the vector basis $b_y(\theta_m, \Phi_{mi})^{\otimes 2}$ ($1 \leq m \leq M$) and is spanned by the columns of the matrix $E_b = [e_{MI+1} \ldots e_{N^2}]$ where $(\lambda_i, e_i)$ is the $i^{th}$ eigenvalue and eigenvector of the quadric-covariance $Q_{yy}$ with $\lambda_1 \geq \ldots \geq \lambda_k \geq \ldots \geq \lambda_{N^2}$. Given that $b_y(\theta, \Phi) = U_y(\theta)\gamma_y(\Phi)$, we deduce there from that:

$$b_y(\theta, \Phi)^{\otimes 2} = U_y(\theta)^{\otimes 2}\gamma_y(\Phi)^{\otimes 2} \quad (32)$$

Consequently, the direction finding procedure of the paragraph on direction finding on the sensor observations x(t) is applicable to the matrix $Q_{yy}$ instead of $R_{xx}$. This remark shows that it is possible to extend the MUSIC procedure to order 4 in the presence of wideband sources, of diffuse sources or else with a sensor array disturbed by coupling phenomena.

Ad-Hoc Modeling of the Various Physical Applications

The method according to the invention may be applied in various cases of application including the following:

Direct Modeling

Polarization diversity [2]: In the presence of a polarization diversity narrowband source the vector $b(\theta, \Phi)$ of equation (4) may be written:

$$b(\theta, \Phi) = P_H a(\theta)^1 + P_V a(\theta)^2 = U(\theta)\Phi \quad (33)$$

where $\Phi = [P_H P_V]^T$ is the vector composed of the two components of the polarization. The matrix $U(\theta) = [a(\theta)^1 \; a(\theta)^2]$ is composed of the responses $a(\theta)^1$ and $a(\theta)^2$ of the sensor array to respectively the $1^{st}$ and the second polarization.

Figure 3:
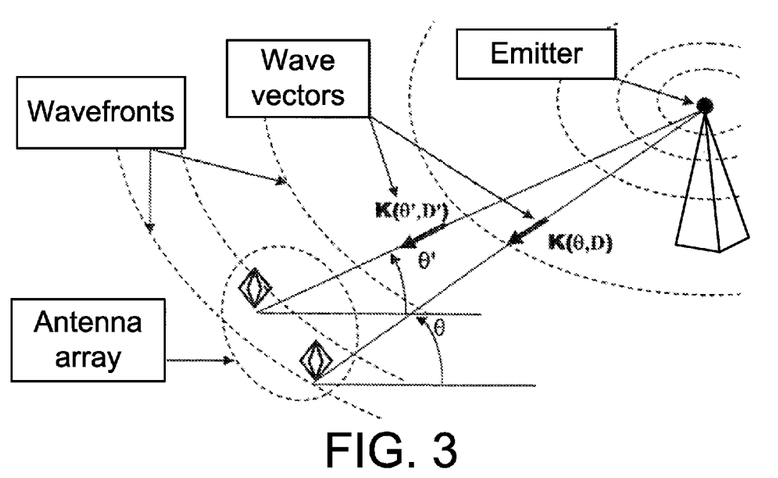
Figure 5:
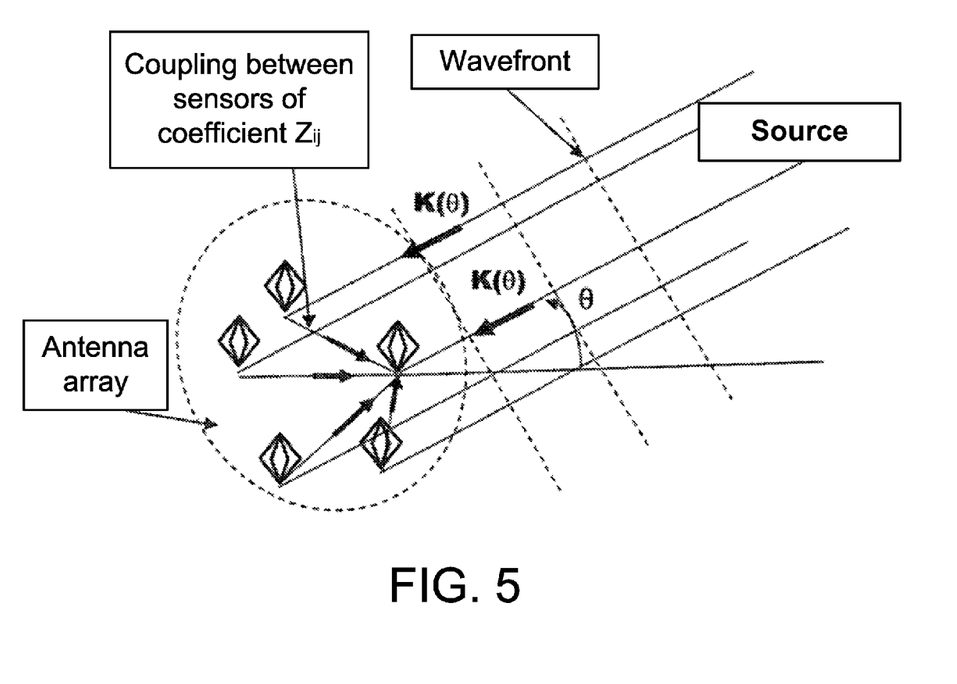
Figure 6:
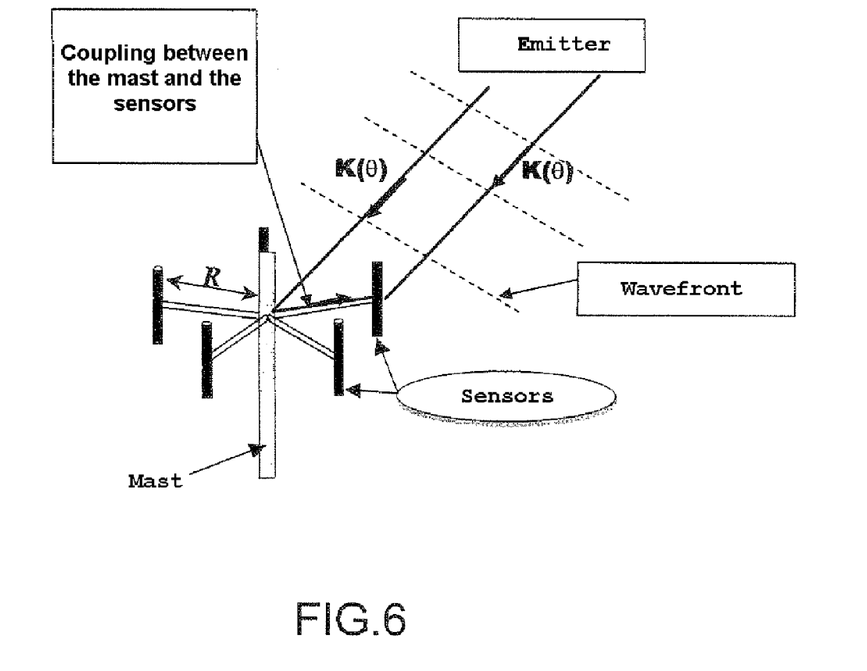

Case of disturbances on the sensors (FIGS. 5 and 6): In a self-calibration context [13] the parameter $\Phi$ characterizes the model errors on the antennas. In particular in the presence of a narrowband source received on a plane wavefront in the case of mutual coupling [15][16][17] the vector $b(\theta, \Phi)$ may be written:

$$b(\theta, \Phi) = Za(\theta) \quad (34)$$

where Z is the coupling matrix and $a(\theta) = [a_1(\theta) \ldots a_N(\theta)]^T$ is the geometrical direction vector in terms of plane wavefront where:

$$a_n(\theta) = \exp\left(-j2\pi\frac{f}{c}(k(\theta)^T u_n)\right) \quad (35)$$

where $k(\theta)$ is the wave vector presented in FIG. 2, $u_n = [x_n \; y_n \; z_n]$ is the position vector of the $n^{th}$ sensor, f the central frequency of the narrowband source and c the speed of propagation of the wave. The wave vector always satisfies $|k(\theta)| = 1$ and equals $k(\theta) = [-\cos(\theta) - \sin(\theta)]^T$ when the wave propagates in the horizontal plane according to FIG. 3.

Figure 7:
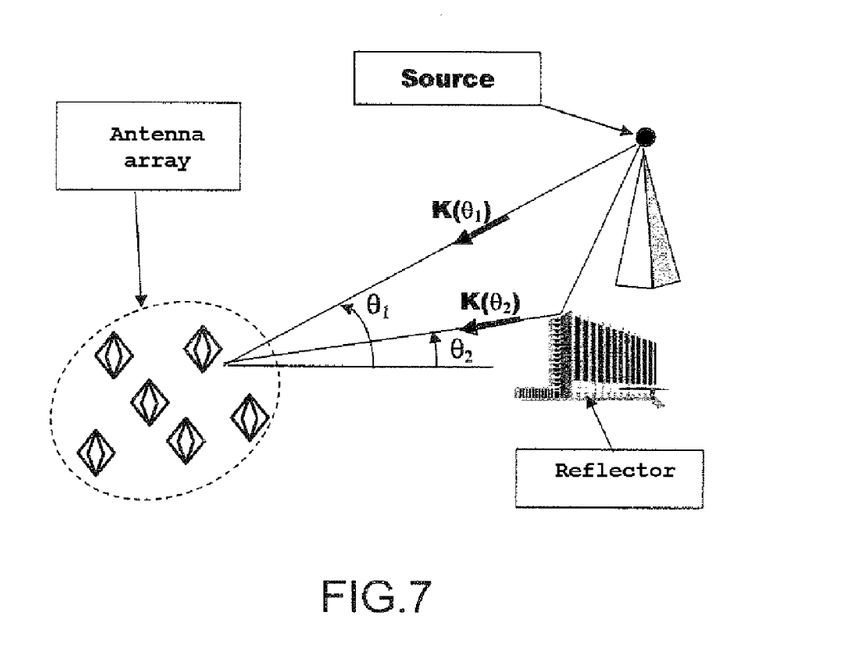

In the particular case of the circular array of FIG. 7, the coupling matrix depends on the 3 parameters $\alpha$, $\beta$ and $\gamma$ where $\alpha$ is the coefficient of coupling between the $n^{th}$ and the $(n+1)^{th}$ sensor, $\beta$ is the coefficient of coupling between the $n^{th}$ and the $(n+2)^{th}$ sensor and $\gamma$ is the coefficient of coupling between the sensors and the central mast. Under these conditions the coupling matrix $Z(\alpha, \beta, \gamma)$ may be written:

$$Z(\alpha, \beta, \gamma) = \begin{bmatrix} 1 & \alpha & \beta & \beta & \alpha & \gamma \\ \alpha & 1 & \alpha & \beta & \beta & \gamma \\ \beta & \alpha & 1 & \alpha & \beta & \gamma \\ \beta & \beta & \alpha & 1 & \alpha & \gamma \\ \alpha & \beta & \beta & \alpha & 1 & \gamma \end{bmatrix} \quad (36)$$

Using (34) and (36), the vector $b(\theta, \Phi)$ may be written:

$$b(\theta, \Phi) = Z(\alpha, \beta, \gamma)a(\theta) = U(\theta)\Phi \text{ with:} \quad (37)$$

$$U(\theta) = \begin{bmatrix} a_1(\theta) & a_2(\theta) + a_5(\theta) & a_3(\theta) + a_4(\theta) & a_{mat}(\theta) \\ a_2(\theta) & a_3(\theta) + a_1(\theta) & a_4(\theta) + a_5(\theta) & a_{mat}(\theta) \\ a_3(\theta) & a_4(\theta) + a_2(\theta) & a_5(\theta) + a_1(\theta) & a_{mat}(\theta) \\ a_4(\theta) & a_5(\theta) + a_3(\theta) & a_1(\theta) + a_2(\theta) & a_{mat}(\theta) \\ a_5(\theta) & a_1(\theta) + a_4(\theta) & a_2(\theta) + a_3(\theta) & a_{mat}(\theta) \end{bmatrix} \text{ and } \Phi = \begin{bmatrix} 1 \\ \alpha \\ \beta \\ \gamma \end{bmatrix} \quad (38)$$

Knowing that $\alpha_{mat}(\theta) = \exp(j2\pi(f/c)(k(\theta)^T u_{mat}))$ where $u_{mat} = [0\;0\;0]^T$ is the position vector of the mast. From a more general point of view the vector $\Phi$ depends on the inter-sensor coupling coefficients.

Case of coherent multipaths (FIG. 7): In the presence of coherent multipaths the model of equation (1) becomes:

$$x(t) = \sum_{m=1}^{M} b(\underline{\theta}_m, \Phi_m)s_m(t) + n(t) \text{ where:} \quad (39)$$

$$b(\underline{\theta}_m, \Phi_m) = \sum_{p=1}^{P} \rho_{mp} a(\theta_{mp}) \quad (40)$$

where $\underline{\theta}_m = [\theta_{m1} \ldots \theta_{mP}]^T$ is the vector composed of the incidences of the multipaths and $\Phi_m = [\rho_{mp} \ldots \rho_{mP}]^T$ is the vector of attenuations. The vector $b(\underline{\theta}_m, \Phi_m)$ may be written directly as that of equation (4) where:

$$b(\underline{\theta}_m, \Phi_m) = U(\underline{\theta})\Phi_m avec U(\underline{\theta}_m) = [a(\theta_{m1}) \ldots a(\theta_{mP})] \quad (41)$$

where $a(\theta)$ is the response of the sensor array to a narrowband source received as plane wavefront with incidence $\theta$. In this case the criterion $J_{det}(\theta)$ depends on the vector $\underline{\theta} = [\theta_1 \ldots \theta_P]$ of the incidences of the P coherent multipaths. It should be remarked that the direct application of MUSIC with the direction vector $a(\theta)$ does not make it possible to determine the incidence of the coherent multipaths.

Modeling by Using a Bounded Expansion

In another type of context such as wideband or diffuse, curved wavefront sources, the direction vector cannot be modeled directly in the form $b(\theta, \Phi) = U(\theta)\gamma(\Phi)$. To return to this modeling the method proposes that a Bounded Expansion (BE) be made about a constant parameter $\Phi = \Phi_0$. In particular in the presence of a curved wavefront, the direction vector will be expanded about the plane wavefront vector, that is to say at $\Phi_0 = 1/D = 0$ (D: distance from the source). In the presence of a wideband source the expansion will be done about $\Phi_0 = f_0$ ($f_0$: central frequency of the band of signals received).

Thus in the presence of a scalar parameter vector $\Phi$, the Bounded Expansion (BE) of order L of $b(\theta, \Phi)$ about $\Phi = \Phi_0$ gives:

$$b(\theta, \Phi) = b(\theta, \Phi_0) + \sum_{i=1}^{L} b^{(i)}(\theta, \Phi_0) \frac{(\Phi - \Phi_0)^i}{i!} = U(\theta)\varphi(\Phi) \text{ where:} \quad (42)$$

$$U(\theta) = [b(\theta, \Phi_0) b^{(i)}(\theta, \Phi_0) \ldots b^{(L)}(\theta, \Phi_0)] \text{ and } \eta(\Phi, \Phi_0) = \begin{bmatrix} 1 \\ \Phi - \Phi_0 \\ \vdots \\ \frac{(\Phi - \Phi_0)^L}{L!} \end{bmatrix} \quad (43)$$

where $b^{(i)}(\theta, \Phi_0)$ is the $i^{th}$ derivative of $b(\theta, \Phi)$ at $\Phi=\Phi_0$. In the presence of several physical parameters the vector $\Phi$ has several components and the bounded expansions are carried out in each of the components about $\Phi=\Phi_0$. In the presence of a vector $\Phi=[\Phi_1 \ldots \Phi_K]^T$ composed of K components, it is necessary to begin by carrying out a BE order L of $b(\theta, \Phi)$, in the parameter $\Phi_1$ at $\Phi_1=\Phi_{01}$ to obtain:

$$b(\theta, \Phi) = U_1(\theta, \Phi^1)\varphi(\Phi_1) \text{ where } \Phi^1 = [\Phi_2 \ldots \Phi_K]^T \quad (44)$$

where: $U_1(\theta, \Phi^1) = [u_1^{(0)}(\theta, \Phi^1) u_1^{(1)}(\theta, \Phi^1) \ldots u_1^{(L)}(\theta, \Phi^1)]$ (45)

$$\text{and } \eta(\Phi_1, \Phi_{01}) = \begin{bmatrix} 1 \\ \Phi_1 - \Phi_{01} \\ \vdots \\ \frac{(\Phi_1 - \Phi_{01})^L}{L!} \end{bmatrix}$$

where $u_1^{(i)}(\theta, \Phi^1)$ is the $i^{th}$ partial derivative of $b(\theta, \Phi)$ with respect to $\Phi_1$ at $\Phi_1=\Phi_{01}$. By carrying out a BE to order L of the columns of $U_1(\theta, \Phi^1)$ in the parameter $\Phi_2$ at $\Phi_2=\Phi_{02}$ we obtain:

$$u_1^{(i)}(\theta,\Phi^1) = U_2^{(i)}(\theta,\Phi^2)\eta(\Phi_2,\Phi_{02}) \text{ where } \Phi^2=[\Phi_3 \ldots \Phi_K]^T \quad (46)$$

By substituting (45) (46) into (44) we obtain:

$$b(\theta,\Phi) = U_2(\theta,\Phi^2)\eta(\Phi_1,\Phi_{01}) \otimes \eta(\Phi_2,\Phi_{02}) \text{ where } \Phi^2 = [\Phi_3 \ldots \Phi_K]^T \quad (47)$$

where the columns of $U_K(\theta)$ are composed of all the partial derivatives of $b(\theta, \Phi)$ with respect to the components of the vector $\Phi$ at $\Phi=\Phi_0$. We do ultimately indeed obtain the model $b(\theta, \Phi)=U(\theta)\phi(\Phi)$ with:

$$b(\theta,\Phi) = U_K(\theta)[\eta(\Phi_1,\Phi_{01}) \otimes \ldots \otimes \eta(\Phi_K,\Phi_{0K})] \quad (48)$$

where the columns of $U_K(\theta)$ are composed of all the partial derivatives of $b(\theta, \Phi)$ with respect to the components of the vector $\Phi$ at $\Phi=\Phi_0$. We do ultimately obtain the model $b(\theta, \Phi)=U(\theta)\phi(\Phi)$ with:

$$U(\theta)=U_K(\theta) \text{ and } \phi(\Phi)=\eta(\Phi_1,\Phi_{01}) \otimes \ldots \otimes \eta(\Phi_K,\Phi_{0K}) \quad (49)$$

In the explicit example the bounded expansions on each of the components of $\Phi$ are to order L. Without departing from the scope of the invention, it is easy to extend the description with BE values whose order is different for each of the parameters $\Phi_{0k}$.

Figure 8:
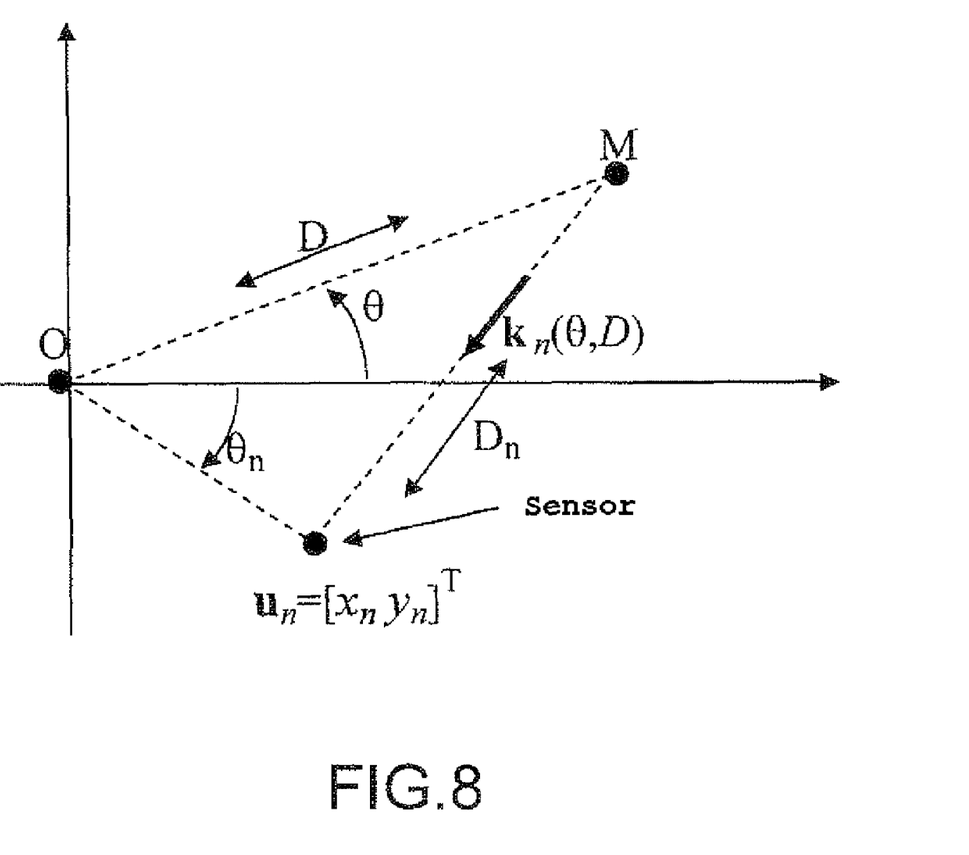

Case of near-field sources illustrated (FIGS. 3 and 8): When the source is received on a curved wavefront the wave vector k depends not only on the incidence θ of the source but also on its distance D and on the position of the sensor on which the source is received. We thus denote the wave vector received on the $n^{th}$ sensor by $k_n(\theta, D)$. Represented in the following figure is the wave vector with respect to the source at the point M and the position $u_n$ of the $n^{th}$ sensor.

Under the narrowband assumption the geometrical response of the $n^{th}$ sensor to a source of incidence θ situated at a distance D may be written:

$$a_n(\theta, D) = \exp\left(-j2\pi \frac{f}{c}(k_n(\theta, D)^T u_n)\right) \frac{c}{D_n f} \quad (50)$$

and the response of the array of sensors may be written:

$$b(\theta, \Phi) = \begin{bmatrix} a_1(\theta, 1/\Phi) \\ \vdots \\ a_N(\theta, 1/\Phi) \end{bmatrix} \text{ with } \Phi = 1/D \quad (51)$$

To transform $b(\theta, \Phi)$ into $U(\theta) \gamma(\Phi)$ the method suggests carrying out a BE of $b(\theta, \Phi)$ about $\Phi_0=0$. Indeed $b(\theta, \Phi=0)$ is the response of the sensor array under a plane wavefront assumption.

Case of narrowband sources received on a wide reception band: In this case the model of equation (1) becomes:

$$x(t) = \sum_{m=1}^{M} a(\theta_m, f_m)s_m(t) + n(t) \quad (52)$$

where the $m^{th}$ source emits about the frequency $f_m$ and where the vector $a(\theta, f)$ may be written in plane wavefront:

$$a(\theta, f) = \begin{bmatrix} a_1(\theta, f) \\ \vdots \\ a_N(\theta, f) \end{bmatrix} \text{ with } a_n(\theta, f) = \exp\left(j2\pi \frac{f}{c}(k(\theta)^T u_n)\right) \quad (53)$$

After a BE of $a(\theta, f)$ about the central frequency $f=f_0$, the vector $a(\theta, f)$ may be written:

$$a(\theta,f) = U_{f0}(\theta)\phi_{g0}(f) \quad (54)$$

The model of equation (4) is thus obtained.

Case of wideband sources: In the presence of wideband sources the model of equation (1) becomes:

$$x(t) = \sum_{m=1}^{M} \sum_{k=1}^{K} a(\theta_m, f_{mk})s_m(t, f_{mk}) + n(t) \quad (55)$$

where the signal of the $m^{th}$ source is decomposed into $K_m$ narrowband sources of complex amplitude $S_m(t,f_{mk})$. According to (55), there exist $K_m$ direction vectors associated with the source of incidence $\theta_m$. These vectors have the following expression:

$$b(\theta_m, \Phi_{mi}) = \sum_{k=1}^{K_{tr}} \alpha_{mki} a(\theta_m, f_{mk}) \text{ with } \Phi_{mi} = \begin{bmatrix} f_{m1} \\ \alpha_{m1i} \\ \vdots \\ f_{mK_m} \\ \alpha_{mK_mi} \end{bmatrix} \text{ for } 1 \le i \le K_m \quad (56)$$

According to (54) and (56) the vectors $b(\theta_m, \Phi_{mi})$ may be written:

$$b(\theta_m, \Phi_{mi}) = U(\theta_m)\varphi(\Phi_{mi}) \text{ for } 1 \le i \le K_m \quad (57)$$
with:

$$U(\theta_m) = \lfloor U_{f_0}(\theta_m) \cdots U_{f_0}(\theta_m) \rfloor \quad (58)$$
and $$\varphi(\Phi_{mi}) = \begin{bmatrix} \alpha_{m1i} \\ \vdots \\ \alpha_{mK_mi} \end{bmatrix} \otimes \begin{bmatrix} \varphi_{f_0}(f_{m1}) \\ \vdots \\ \varphi_{f_0}(f_{mK_m}) \end{bmatrix}$$

The expression (58) shows that the parameter vectors $\Phi_{mi}$ depend on the central frequency $f_{mc}$ and on the band $B_m$ of the signal of the $m^{th}$ source:

$$\cdots f_{mc} = \frac{1}{p_{m1}+\ldots+p_{mK_m}} \sum_{k=1}^{K_m} p_{mk} f_{mk} \text{ and} \quad (59)$$

$$B_m^2 = \frac{1}{p_{m1}+\ldots+p_{mK_m}} \sum_{k=1}^{K_m} p_{mk}(f_{mk}-f_{mc})^2$$

where $p_{mk} = E[|s_m(t, f_{mk})|^2]$. Consequently after an estimation of the $\Phi_{mi}$ and of $p_{mk}$ it is possible to deduce the central frequency $f_{mc}$ and the band $B_m$ of the $m^{th}$ source.

Figure 4:
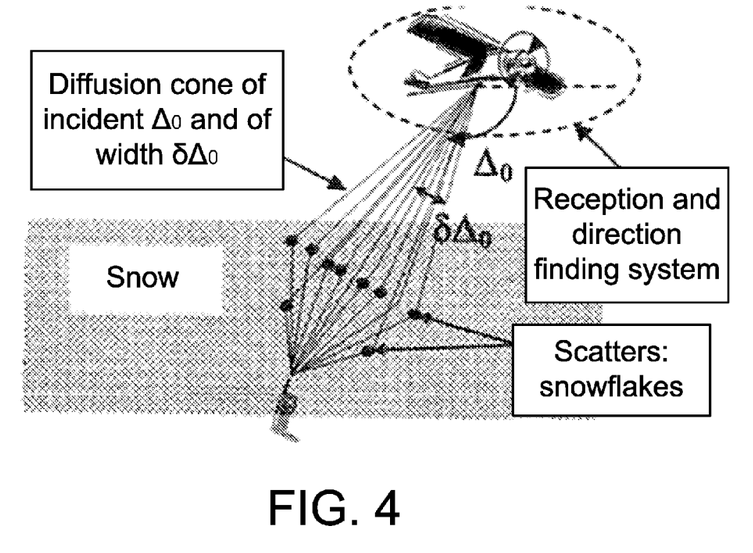

Case of diffuse sources (FIG. 4): In the case of diffuse sources a source is decomposed according to several sources as a wideband source. However this decomposition is not done by frequency, but by incidence. In the presence of diffuse sources the model of equation (1) becomes:

$$x(t) = \sum_{m=1}^{M} \sum_{k=1}^{K_m} \rho_m a(\theta_m + \delta\theta_{mk}) s_m(t - \delta\tau_{mk}) + n(t) \quad (60)$$

where the signal of the $m^{th}$ source is decomposed into $K_m$ discrete sources of complex amplitude $\rho_m s_m(t-\delta\tau_m)$ and of incidence $\theta_m + \delta\theta_{mk}$. After a BE of $a(\theta)$ about the central incidence $\theta = \theta_0$, the vector $a(\theta_0 + \delta\theta)$ may be written:

$$a(\theta_0+\delta\theta) = U_0(\theta_0)\phi_0(\delta\theta) \quad (61)$$

According to (60), there exist $K_m$ direction vectors associated with the source of central incidence $\theta_m$. These vectors have the following expression:

$$b(\theta_m, \Phi_{mi}) = \sum_{k=1}^{K_m} \alpha_{mki} a(\theta_m + \delta\theta_{mk}) \quad (62)$$
with $$\Phi_{mi} = \begin{bmatrix} \delta\theta_{m1} \\ \alpha_{m1i} \\ \vdots \\ \delta\theta_{mK_m} \\ \alpha_{mK_mi} \end{bmatrix}$$

for
$1 \le i \le K_m$

According to (61) and (62) the vectors $b(\theta_m, \Phi_{mi})$ may be written:

$$b(\theta_m, \Phi_{mi}) = U(\theta_m)\varphi(\Phi_{mi}) \text{ for } 1 \le i \le K_m \quad (63)$$
with:

$$U(\theta_m) = [U_0(\theta_m) \cdots U_0(\theta_m)] \quad (64)$$
and $$\varphi(\Phi_{mi}) = \begin{bmatrix} \alpha_{m1i} \\ \vdots \\ \alpha_{mK_mi} \end{bmatrix} \otimes \begin{bmatrix} \varphi_0(\delta\theta_{m1}) \\ \vdots \\ \varphi_0(\delta\theta_{mK_m}) \end{bmatrix}$$

The expression (64) shows very clearly that the parameter vectors $\Phi_{mi}$ depend on the cone width $\Delta\theta_m$ of the signal of the $m^{th}$ source:

$$\Delta\theta_m^2 = \frac{1}{p_{m1}+\ldots+p_{mK_m}} \sum_{k=1}^{K_m} p_{mk}(\delta\theta_{mk})^2 \quad (65)$$

where $p_{mk} = E[|s_m(t-\delta\tau_{mk})|^2]$. Consequently, after an estimation of the $\Phi_{mi}$ and of $p_{mk}$ it is possible to deduce the cone width $\Delta\theta_m$ of the signal of the $m^{th}$ source.

Modeling by Combining the Disturbances

The disturbances of the response of the array of sensors cited hereinabove may all be combined together. It is thus possible to combine polarization diversity with inter-sensor coupling, coherent paths, curved wavefront, wideband and diffuse sources. Examples of combinations are thus given hereinbelow. The various cases are represented by FIGS. 4 to 8.

Example No. 1—coupling (FIGS. 5 and 6) and polarization: By associating coupling and polarization, the vector $b(\theta, \Phi)$ may be written according to (33) and (34):

$$b(\theta,\Phi) = Z(P_H a(\theta)^1 + P_V a(\theta)^2) = U(\theta) \quad (66)$$

Knowing that $Z a(\theta)^1 = U(\theta)^1$ (z and $Z a(\theta)^2 = U(\theta)^2 \Phi_Z$, the matrix $U(\theta)$ and the vector (may be written:

$$U(\theta) = \begin{bmatrix} U^1(\theta) & 0 \\ 0 & U^2(\theta) \end{bmatrix} \text{ and } \Phi = P \otimes \Phi_Z \quad (67)$$

where $P = [P_H \ P_V]^T$ is the vector of the components of the polarization.

Example No. 2—curved wavefront (FIGS. 3 and 8) and wideband: In this case the response of the $n^{th}$ sensor to a source of incidence θ depends also on the distance D and on the frequency f of the emitter according to equation (50):

$$a_n(\theta, D, f) = \exp\left(-j2\pi\frac{f}{c}(k_n(\theta, D)^T u_n)\right)\frac{c}{D_n f} \quad (68)$$

The vector $b(\theta, \Phi=[Df]^T)$ of equation (51) becomes after a BE on $\Phi=[Df]$:

$$a(\theta, \Phi = [D/f]^T) = \begin{bmatrix} a_1(\theta, D, f) \\ \vdots \\ a_N(\theta, D, f) \end{bmatrix} = U_{f0}(\theta)\varphi_{f0}(D, f) \quad (69)$$

and the parameter vector $\Phi_{mi}$ contained in $b(\theta_m, \Phi_{mi})$ of equation (56) depends not only on the $\alpha_{mki}$ and frequency $f_{mk}$ but also on the distance $D_m$ of the $m^{th}$ emitter.

Example No. 3 illustrated—coupling (FIGS. 5 and 6) and other disturbances: When the array of coupled sensors contains sensors whose response $a(\theta, \Phi)$ depends on a parameter vector $\Phi$ where $a(\theta, \Phi)=U_1(\theta)\phi_1(\Phi)$, the combined direction vector $b(\theta, \Phi)$ may be written according to (34):

$$b(\theta,\Phi)=Za(\theta,\Phi)=ZU_1(\theta)\phi_1(\Phi)=V(Z,\theta)\phi_1(\Phi) \quad (70)$$

The $i^{th}$ column $V_i(Z, \theta)=Z\,u_{1i}(\theta)$ of $V(Z, \theta)$ may be written $V_i(Z, \theta)=U_{1i}(\theta)\Phi_z$ according to (37), the vector $b(\theta, \Phi)$ becomes:

$$b(\theta,\Phi)=[U_{1i}(\theta) \ldots U_{1N}(\theta)](\phi_1(\Phi)\otimes\Phi_Z) \quad (71)$$

BIBLIOGRAPHY

[1] R O. Schmidt: "A signal subspace approach to multiple emitter location and spectral estimation", November 1981.
[2] FERRARA, PARKS "Direction finding with an array of antennas having diverse polarizations", IEEE trans on antennas and propagation, March 1983.
[3] S. VALAE, B. CHAMPAGNE and P. KABAL "Parametric Localization of Distributed Sources", IEEE trans on signal processing, Vol. 43, No. 9 September 1995
[4] D. ASZTELY, B. OTTERSTEN and AL. SWINBEEHURST "A Generalized array manifold model for local scattering in wireless communications", Proc of ICASSP, pages 4021-4024, Munich 1997.
[5] M. BENGTSSON and B. OTTERSTEN "Low-Complexity Estimators for Distributed Sources", trans on signal processing, Vol. 48, No. 8, August 2000.
[6] H. Wang and M. Kaveh "Wideband adaptive array based on the coherent signal-subspace transformation", ICASSP 87, Dallas, pages 2011-2014.
[7] H. Wang and M. Kaveh "Coherent Signal Subspace processing for the detection and estimation of multiple wideband sources", IEEE trans on ASSP, Vol. 33, No. 4, pages 823-831, 1985.
[8] Y. Grenier and Ph. Loubaton "Localisation de sources large bande par des methods temporelles", $12^{iéme}$ Colloque GRETSI, Juans les Pins, June 1989.
[9] B. Senadji and Y. Grenier "Broadband source localization by regularization techniques", ICASSP 93, pages 321-324.
[10] K M Buckley, L J. Griffiths "Eigenstructure Based broadband Source Location Estimation", ICASSP 86 Tokyo.
[11] A. Ferréol and Marc Chenu-Tournier. "Space Frequency direction finding in wide-band and multi-path contexts". ICASSP 2000, Istanbul.
[12] A. FLIELLER, A. FERREOL, P. LARZABAL, H. CLERGEOT "Robust bearing estimation in the presence of direction-dependent modelling errors: identifiability and treatment", ICASSP 1994.
[13] A. FERREOL and P. LARZABAL "Un algorithme non iteratif pour la localisation de sources avec des erreurs de modele dependant de leur direction", GRETSI, Juan les pins, September 1993, pages 237-240.
[14] FR. Gantmacher "The theory of matrices", 1959, Vol. I-II, Chelsa.
[15] C C. Yeh and M L. Leou and D R. Ucci "Bearing estimations with mutual coupling present", IEEE trans on antennas propagation, Vol. 37, No. 10, October 1989, pages 1332-1335.
[16] B. Himed and D. Weiner "Compensation for mutual coupling effects in direction finding", ICASSP 1990.
[17] Steykal and JS. Herd "Mutual Coupling compensation in Small Array Antennas", IEEE trans on antennas propagation, Vol. 38, No. 12 December 1990, pages 1971-1975.

The invention claimed is:

1. A method of multiparameter direction finding of emitters using an array of N sensors for receiving signals and an observation vector corresponding to the received signals, the received signals being a function of directions of arrival $\theta_m(1\leq m\leq M)$ of the M emitters and a plurality of nuisance parameters N is an integer greater than 1, the method comprising:
   a) selecting one of the directions of arrival (θ) corresponding to one of the M emitters to be first determined, other non-selected ones of the directions of arrival and the nuisance parameters being grouped as a set of secondary parameters ($\Phi_0$);
   b) expressing a direction vector ($b_0$) in the form of a linear combination that separates the selected one of the directions of arrival (θ) from the set of secondary parameters ($\Phi_0$):$bb_0(\theta, \Phi_0)=U_0(\theta)\phi_0*(\Phi_0)$;
   c) applying a MUSIC (MUltiple SIgnal Classification) algorithm direction finding step by factorizing a MUSIC criterion for the determination of the selected one of the directions of arrival, the MUSIC criterion used in the MUSIC procedure comprising the ratio of the determinants of the matrices $Q_1(\theta)=U(\theta)^H \Pi_b U(\theta)$ and $Q_2(\theta)=U(\theta)^H U(\theta)$, where $\Pi_b$ referring to projected noise;
   d) on the basis of determined one or more of the directions of arrival, selecting another one of the directions of arrival $\theta_m$ to be determined and grouping non-selected ones of the directions of arrival and the nuisance parameters as another set of secondary parameters $\Phi_m$ and expressing another direction vector $b_m$ in the form of a linear combination that separates the selected another one of the directions of arrival ($\theta_m$) from the another set of secondary parameters ($\Phi_m$): $b_m(\theta_m, \Phi_m)=U_m(\theta_m)\gamma(\Phi_m)$;
   e) applying the MUSIC algorithm direction finding step by factorizing a criterion for the determination of the selected another one of the directions of arrival $\theta_m$; and
   f) repeating steps d) to e) in order to determine another component of the another set of secondary parameters ($\Phi_m$);
   wherein the nuisance parameters includes distances of the emitters in terms of spherical wavefront, frequency bands of the signals, coupling coefficients of the array, cone widths of emitters, or polarizations of signals.

2. The method as claimed in claim 1, wherein step d) comprising a step of separating a chosen parameter $\phi$ and other secondary parameters $\Phi'$ by modeling the vector $\gamma(\Phi_m)$ in the manner of: $\gamma(9\phi_m)=F_1(\phi)\gamma_1(\Phi')$.

3. The method as claimed in claim 2, wherein the MUSIC procedure calculates the noise projector $\Pi_b$ onto the quadric-covariance of x(t) or of its transformed version y(t)=f(x(t)).

4. The method as claimed in claim 1, comprising a step of transforming the observation vector corresponding to the signals received on the sensors in order to increase the capacity of the direction finding in terms of number of emitters.

5. The method as claimed in claim 4, wherein the transformation is a spatio-temporal transformation of an already transformed observation.

6. The method as claimed in claim 5, wherein the transformation is a spatio-temporal transformation utilizing the non circularity.

7. The method as claimed in claim 4, wherein the transformation is a transformation utilizing the non circularity of the signal such that $y(t)=f(x(t))=[x(t)^T \exp(j2\pi\beta t)x(t)^{*T}]^T$.

8. The method as claimed in claim 4 wherein the transformation is a spatio-temporal transformation utilizing the non circularity.

9. The method as claimed in claim 1, wherein the MUSIC procedure calculates the noise projector $\Pi_b$ onto the quadric-covariance of x(t) or of its transformed version y(t)=f(x(t)).

10. The method as claimed in claim 1, wherein the vector $\Phi_m=[\phi_{m1} \ldots \phi_{mK}]$ of $\gamma(\Phi_m)$ is determined by performing the following steps for ($1 \leq m \leq M$):

Step-A: Initialization to k=1, $\Phi_m'=[\phi_{m2} \ldots \phi_{mK}]$
Step-B: Calculation of $\Pi_m=I-\gamma(\Phi_m)\gamma(\Phi_m)^\#$
Step-C: Modeling of $\gamma(\Phi_m)=G_1(\phi_{mk})\gamma_1(\Phi_m')$
Step-D: Calculation of the criterion $C_{m-det}(\phi)$ of the equations $$C_{m\text{-det}}(\varphi) = \frac{\det(Q_{m1}(\varphi))}{\det(Q_{m2}(\varphi))} \quad (72)$$

with:

$$Q_{m1}(\varphi) = G_1(\varphi)^H \Pi_m G_1(\varphi) \text{ and } Q_{m2}(\varphi) = G_1(\varphi)^H G_1(\varphi) \quad (73)$$

Step-E: Minimizing of $C_{m-det}(\phi)$ to obtain $\phi_{mk}$
Step-F: Determination of $\gamma_1(\Phi_m')$ by searching for the generalized eigenvector associated with the eigenvalue $\lambda_{min}^G \{Q_{m1}(\phi), Q_{m2}(\phi_{mk})\}$
Step-G: If k<K: $\gamma(\Phi_m) \leftarrow \gamma_1(\Phi_m')$, $\Phi_m'=[(\phi_{m(k+1)} \ldots \phi_{mK}]$ and k←(k+1) return to step-B.

11. The method as claimed in claim 1, comprising a step where a bounded expansion is performed about a constant parameter $\Phi=\Phi_0$ before performing step b).

12. The method as claimed in claim 1, wherein the MUSIC procedure calculates the noise projector $\Pi_b$ onto the quadric-covariance of x(t) or of its transformed version y(t)=f(x(t)).

13. The method as claimed in claim 1, wherein the MUSIC procedure calculates the noise projector $\Pi_b$ onto the quadric-covariance of x(t) or of its transformed version y(t)=f(x(t)).

* * * * *